United States Patent [19]

Foggett

[11] 4,017,393
[45] Apr. 12, 1977

[54] APPARATUS FOR DISPENSING A LIQUID

[75] Inventor: H. Rodney Foggett, Toronto, Canada

[73] Assignee: Her Majesty the Queen in right of Ontario as represented by the Minister of the Environment, Toronto, Canada

[22] Filed: Feb. 23, 1976

[21] Appl. No.: 660,247

[52] U.S. Cl. .............................. 210/101; 210/128; 210/152; 210/206; 222/450

[51] Int. Cl.² .......................................... C02B 1/23

[58] Field of Search ............ 210/97, 101, 128, 129, 210/152, 205, 206; 222/450–452

[56] References Cited

UNITED STATES PATENTS

| 489,084 | 1/1893 | Morgan | 210/206 |
|---|---|---|---|
| 1,200,324 | 10/1916 | Earl et al. | 222/450 X |
| 2,479,842 | 8/1949 | Kirwan | 210/101 X |
| 3,795,349 | 3/1974 | Schetinin | 222/450 |

FOREIGN PATENTS OR APPLICATIONS 532,553  11/1956  Canada .............................. 222/450

Primary Examiner—John Adee

[57] ABSTRACT

An apparatus for dosing a treatment solution into a waste liquid comprises a device for measuring and dispensing a predetermined volume of solution, means for delivering treatment solution to and from the device and control means adapted to determine when waste liquid is present to be dosed and activate the device to dispense a measured volume of treatment solution into a waste liquid. The device has a container with an inlet and outlet diaphragm valve, and an air vent means for venting the chamber during filling and dispensing of treatment solution. Reversible actuation means is provided for simultaneously opening the inlet valve and closing the outlet valve to permit filling of the chamber with a treatment solution and for simultaneously closing the inlet valve and opening the outlet valve to permit dispensing of the measured volume of treatment solution. The control means operates the reversible actuation means to dispense treatment solution into the waste liquid and is adapted to close the outlet valve and open the inlet valve in the absence of waste liquid to be dosed.

12 Claims, 3 Drawing Figures

APPARATUS FOR DISPENSING A LIQUID

FIELD OF INVENTION

This invention relates to an apparatus for dosing a treatment solution into a waste liquid and to a device adapted to repeatedly measure and dispense a predetermined volume of liquid.

BACKGROUND OF THE INVENTION

With septic tank facilities, it is important to decrease the quantity of phosphates in septic tank effluent to cut down on the amount of phosphates in water run-off in residential, recreational, and rural areas. A reduction in the amount of phosphates in water run-off substantially decreases the rate of eutrophication in fresh-water areas. By introducing various types of treatment solutions into a septic tank, it is possible by chemical reaction to precipitate the phosphates so as to substantially reduce the quantity of phosphates in the septic tank effluent. The precipitated phosphates remain in the sludge of the septic tank so that a yearly pumping of a septic tank substantially reduces polluting water run-off with phosphates. It is, however, a problem in consistently introducing into the waste liquid a predetermined quantity of treatment solution which is of sufficient concentration to precipitate the expected amount of phosphates in the waste liquid.

Metering pumps could be used to introduce treatment solutions into a septic tank and the like; however, problems are usually encountered due to the corrosive nature of the treatment solutions. For example, alum (aluminum sulphate) is a particularly useful chemical for precipitating phosphates in effluent, however, alum is very corrosive on most types of metal so that a standard type of metallic metering pump could not withstand the handling of alum in dispensing measured quantities of a treatment solution into a septic tank.

It is therefore an object of this invention to provide an apparatus for dosing a treatment solution into a waste liquid which is economical to manufacture, reliable and consistently doses a waste liquid with a predetermined volume of treatment solution.

It is another object of the invention to provide an apparatus for dosing a treatment solution into a waste liquid which includes a device for measuring and dispensing a predetermined volume of treatment solution and control means for determining when waste liquid is present to be dosed and in turn, activate the device to dispense a measured volume of treatment solution into the waste liquid.

It is yet another object of the invention to provide an apparatus for dosing a treatment solution into a waste liquid which is adapted to dose the treatment solution into a septic tank system which is operated under pressure.

It is yet a further object of the invention to provide a venting system for the measuring device used with the apparatus for dosing waste liquid which vents the container of the device during filling and dispensing of treatment solution where the vent means does not permit overflow of the treatment solution to its surroundings.

It is yet another object of the invention to provide a control means with the apparatus which is adapted for connection to a flush toilet to sense when a toilet is flushed to thereby activate a device for measuring and dispensing liquid so that treatment solution is dosed into a waste liquid.

It is a further object of the invention to provide a device for measuring and dispensing a predetermined volume of liquid which is economical to manufacture and is of a construction which resists corrosion in handling various types of corrosive chemicals by the provision of co-acting inlet and outlet diaphragm valves on the device.

It is another object of the invention to provide a reversible actuation means on the device which simultaneously opens or closes the diaphragm valves.

SUMMARY OF THE INVENTION

The invention provides an apparatus for dosing a treatment solution into a waste liquid which is easy to maintain. The apparatus includes a device for measuring and dispensing a treatment solution which is constructed in a manner to be highly resistant to corrosion by a treatment solution. The apparatus can be readily adapted for use on flush toilets for purposes of dosing effluent from a flush toilet. The apparatus operates independently of the water supply for a flush toilet or other facility such as waste basins and the like, so that there are not complications regarding waste liquid interfering with fresh-water supply since the apparatus is isolated from the fresh-water supply.

According to an aspect of the invention, a device for measuring and dispensing a treatment solution is provided with reversible actuation means for simultaneously opening the inlet valve and closing the outlet valve to permit filling of the device with treatment solution and simultaneously closing the inlet valve and opening the outlet valve to permit dispensing of a measured volume of treatment solution. The operation of the device in this manner ensures a dosing of waste liquid with a consistent volume of treatment solution so that the waste liquid is properly treated.

The apparatus comprises a device for measuring and dispensing a predetermined volume of treatment solution, means for delivering treatment solution from a reservoir to the device and means for delivering a measured volume of treatment solution from the device to the waste liquid to be dosed, and control means adapted to determine when waste liquid is present to be dosed and activate the device to dispense a measured volume of treatment solution into the waste liquid. The device has a container which defines a chamber of predetermined volume with an inlet in communication with the means for delivering treatment solution to the device and an outlet in communication with the means for delivering treatment solution to waste liquid. An inlet valve and outlet valve are located respectively at the inlet and outlet. Air vent means for venting the chamber during the filling and dispensing of treatment solution is provided which is adapted to prevent overflow of the treatment solution from the vent means to the surroundings. A reversible actuation means is provided for operating the valves. The control means is adapted to operate the reversible actuation means when waste liquid is to be dosed to open the outlet valve and close the inlet valve. The control means is also adapted to close the outlet valve and open the inlet valve for refilling the chamber with treatment solution in the absence of a waste liquid.

The device according to this invention for measuring and dispensing a volume of liquid may be provided with diaphragm valves at the inlet and outlet which are highly resistant to corrosion by the treatment solution. It is understood that the invention encompasses a use of other types of measuring devices having corrosion-resistant valves which are adapted to be simultaneously opened and closed or closed and opened.

In adapting the apparatus for use in dosing toilet effluent, the control means may be provided with sensing means for sensing when a toilet is flushed and, in turn, electrically activate an electrical solenoid to operate the actuation means in a manner to dispense treatment solution from the container.

Various types of linkage assemblies may be used in the simultaneous operation of the valves in the prescribed manner. For example, a linkage assembly may be used in association with diaphragm valves which is adapted to move reciprocal plungers on the diaphragm valves in directions which either open or close the valves in accordance with the fill or dispensing operation of the device.

A treatment solution may be stored in a reservoir which has a tube running from the reservoir to the measuring device. A vent tube in turn may run from the measuring device back into the reservoir. In instances where the treatment solution is dispensed into a pressurized system, an air pump may be connected to the reservoir to pressurize the reservoir so that the pressure therein is greater than the pressure in the system being dosed. In addition, the reservoir should be maintained at a level above the level of the device for measuring the treatment solution so that the treatment solution flows by gravity into the device.

DESCRIPTION OF THE DRAWINGS

These and other objects, advantages and features of the invention will become apparent to those skilled in the art in the following detailed description of preferred embodiments of the invention as shown in the drawings wherein.

DETAILED DESCRIPTION OF THE PREFERRED EMBODIMENTS

Figure 1:
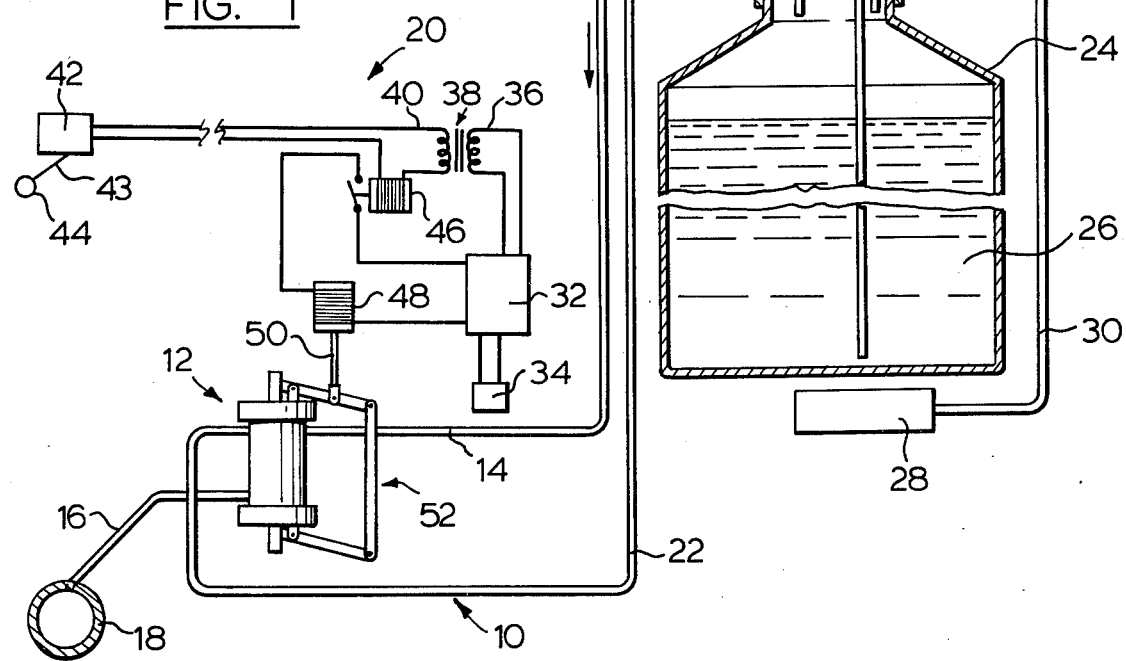
FIG. 1 is a schematic view of the apparatus according to this invention.

The apparatus according to a preferred embodiment of the invention as shown in FIG. 1 is adapted for use in association with a flush toilet which is connected to a septic tank system. The apparatus generally designated at 10 comprises a measuring and dispensing device 12, a treatment solution supply line 14, a treatment solution dispensing line 16 which is connected to a septic tank service line 18 (in communication with a septic tank system not shown), and a control device 20 for operating the measuring and dispensing device 12. A vent line 22 which is in communication with the measuring/dispensing device 12 is led back into a reservoir 24 which holds a large quantity of treatment solution 26.

The apparatus as shown is adapted for use in supplying treatment solution into a service line 18 which is under pressure so that an air compressor 28 supplies air pressure to the reservoir 24 by line 30. The pressure within reservoir 24 is greater than the pressure within the service line 18 to ensure that when the dispensing device is operating, the treatment solution is dispensed into the waste liquid.

As discussed, a treatment solution containing, for example, alum (aluminum sulphate) may be dosed into waste liquid such as from toilet effluent to react with the effluent and precipitate the phosphates from the solution. The precipitated phosphates settle in the sludge of the septic tank so that the effluent from the septic tank has substantially reduced quantities of phosphates, thereby reducing the amount of phosphates in water run-off into fresh-water lakes. It is understood, of course, that the apparatus may be used to dispense other types of treatment solutions for various other functions in operating septic tank systems and other types of waste treatment systems.

In the dosing of a solution of alum (aluminum sulphate) into a waste liquid, it is important to consider the corrosive properties of such a chemical. Therefore the reservoir supply line, dispensing line and venting lines should be made of a plastic or glass material which resists corrosion by the aluminum sulphate. In addition, the measuring and dispensing device 12 should be fabricated from materials and include valves which resist corrosion by such a chemical.

The control device 20 includes a junction box 32 which is connected to a power supply 34. The power supply may be the conventional 110 volt AC circuit. The power supply has a connection with the primary winding 36 of a transformer 38 which is adapted to provide a 12 volt potential in the secondary winding 40 of the transformer to eliminate the risk of electrocution. The 12 volt circuit is connected to a device 42 on a toilet float valve mechanism which senses when the float 44 is in a lowered position in a toilet reservoir to indicate that the toilet has been flushed. The device 42 may include a microswitch which is closed by movement of the arm 43 in a downward direction. With float 44 in such a position, the microswitch is closed to activate microswitch 46 which completes the circuit through electrical solenoid 48. Upon activation of solenoid 48, the solenoid plunger 50 is moved upwardly to close the inlet valve and open the outlet valve to dispense a measured volume of treatment solution into service line 18 which is connected to the flush toilet and the septic tank system. The inlet and outlet valves of the measuring apparatus 12 are controlled by a linkage assembly 52. Instead of using a microswitch to sense when the arm 43 is lowered, a mercury switch may be mounted on arm 43 in a manner so that the contact in the switch is closed when the arm 43 is lowered.

Figure 2:
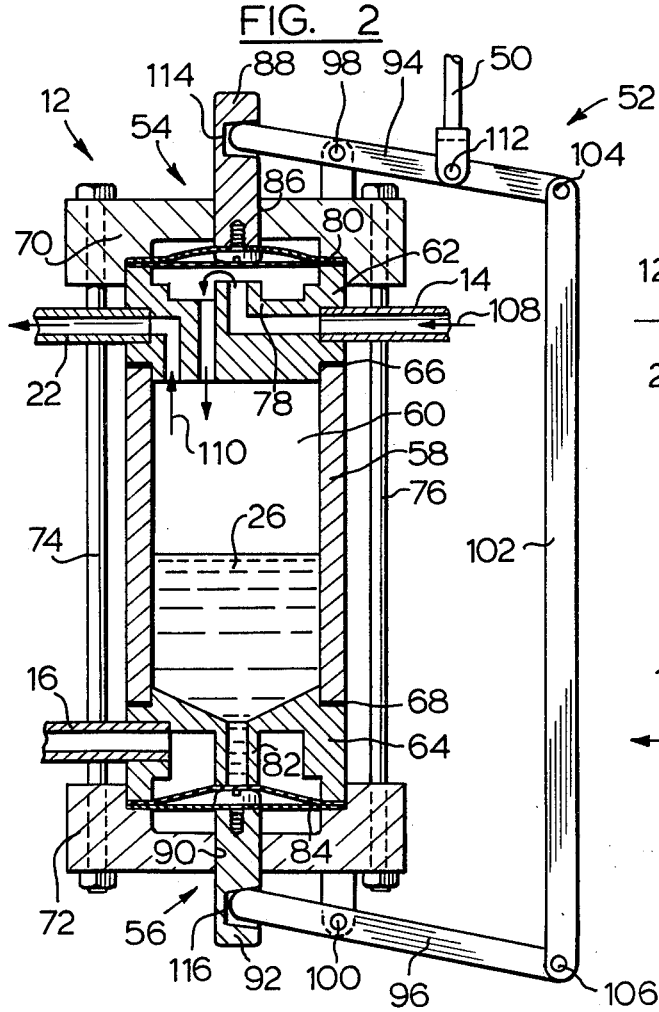
FIG. 2 is a sectioned elevation view of a preferred device according to this invention for measuring and dispensing a liquid, as shown in the stage of being filled with a treatment solution.
Figure 3:
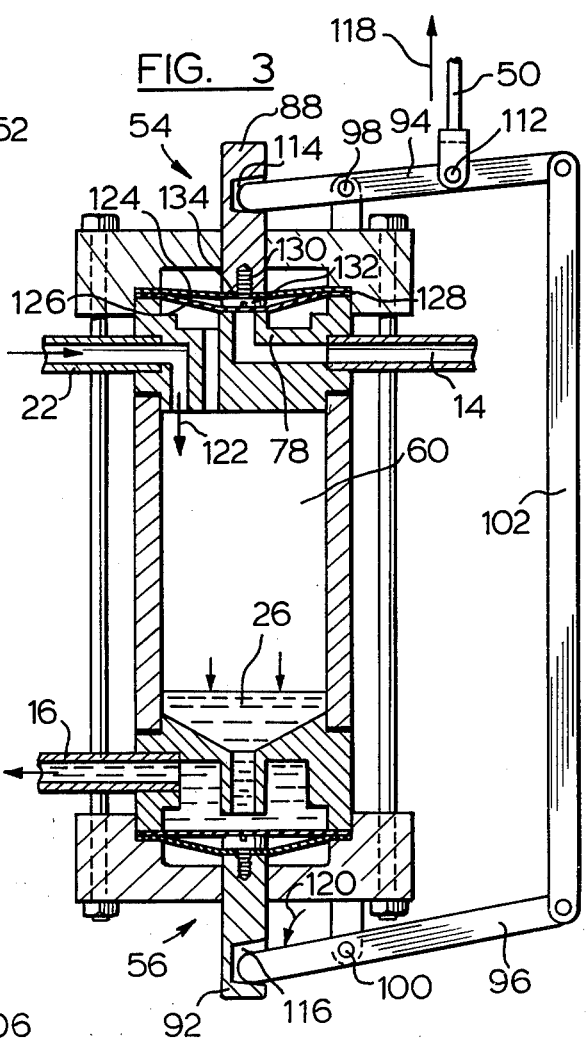
FIG. 3 is a similar sectioned elevation view of the device of FIG. 2 shown in the position of dispensing a treatment solution.

A preferred construction of the device according to this invention for measuring and dispensing the treatment solution is shown in FIGS. 2 and 3. The device 12 comprises an inlet or supply line 14 at the top of the device, a vent line 22, and a dispensing line 16 at the bottom of the device. A diaphragm valve 54 is provided at the inlet and a diaphragm valve 56 is provided at the outlet. A container 58 has a cavity or chamber 60 of predetermined volume such that, when filled, contains a quantity of treatment solution so that when dosed into the effluent of a toilet or the like, sufficient treatment solution is present to cause the desired precipitation of phosphates or treat the solution in any other desired manner. For example, in dosing waste liquid from a flush toilet with alum, approximately 50 ml. of a solution containing alum at a concentration of approximately 120 gm/l. is required. In this embodiment, the form of alum used was $Al_2(SO_4)_3 \cdot xH_2O$ where $x$ is approximately 14. The volume of chamber 60 is therefore approximately 50 mls.

The container 58 consists of a tubular body portion sandwiched between valve seats 62 and 64 where the ends of the tube are sealed to the valve seats by annular seals 66 and 68. End caps 70 and 72 complete the assembly and are drawn together by threaded bolts 74 and 76 in the manner shown. In valve seat 62, the inlet is surrounded by a shoulder 78 against which the diaphragm 80 abuts to close the inlet. Similarly, with valve seat 64, the outlet of the container 58 is surrounded by a shoulder 82 against which diaphragm 84 abuts to close the outlet. End cap 70 is provided with a bore 86 to accommodate and permit reciprocal movement of diaphragm plunger 88. Similarly, end cap 72 is provided with bore 90 which is adapted to permit reciprocal movement of diaphragm plunger 92.

In order to isolate the fill cycle of the device from the dispensing cycle, there must be a simultaneous opening and closing of diaphragm valves 54 and 56. This is accomplished by the linkage assembly 52 which consists of two parallel link arms 94, 96 which have two free ends. Between the two free ends, link arm 94 is pivotally connected to end cap 70 at 98. Similarly, link arm 96 is pivotally connected to end cap 72 at 100 in the manner shown. An interconnecting link arm 102 is connected to corresponding free ends of link arm 94 and 96 in a pivotal manner at 104 and 106.

The positions of the diaphragm valves 54 and 56 as shown in FIG. 2 is for permitting the filling of chamber 60 with a treatment solution 26. The treatment solution enters the chamber in the direction of arrow 108 and the air in the chamber escapes in the direction of arrow 110 through vent tube 22. Treatment solution 26 will continue to run into the chamber and flow up vent tube 22 until the solution reaches the level of treatment solution in reservoir 24 as predicted by basic hydrostatic principles. It should be noted that as the quantity of treatment solution 26 in reservoir 24 is lowered, naturally the height which the treatment solution achieves in vent tube 22 upon filling of device 12, will also change. This change in the height of the liquid in tube 22 does not substantially affect the amount of measured quantity of treatment solution because the tube holds an insignificant amount of solution relative to the quantity of solution contained in container 58.

To reverse the cycle of the device 12, the linkage assembly 52 is moved to the position as shown in FIG. 3. The treatment solution 26 is dispensed into the service line 18. This occurs when the toilet is flushed and the electrical solenoid 48 is activated to withdraw solenoid plunger 50 which is pivotally connected to parallel link arm 94 at 112. In raising parallel link arm 94, parallel link arm 96 is also raised due to interconnecting member 102. The first free end of parallel link arm 94 engages plunger 88 by way of recess 114. Similarly, the free end of link arm 96 engages plunger 92 by way of recess 116. This upward movement of plunger 50 in the direction of arrow 118 as shown in FIG, 3 causes plunger 88 to move downwardly and close diaphragm valve 54 and similarly, to withdraw plunger 92 and open diaphragm valve 56. Parallel link arms 94 and 96 pivot about points 98 and 100 in the direction of arrow 120. In opening the diaphragm valve 56, the treatment solution 26 is dispensed through dispensing tube 16 into the service line 18. Simultaneously, air is drawn into chamber 60 through vent tube 22 in the direction of arrow 122. Diaphargm valve 54 is closed to preclude entry of additional treatment solution into chamber 60.

The flow rates of the treatment solution through dispensing tube 16 should be selected such that the treatment solution is entirely dispensed within preferably 8 to 10 seconds because in having the apparatus connected to the flush toilet in the manner shown in FIG. 1, when float 44 is raised to the upper position when the toilet reservoir is filled, the microswitch 46 is turned off, thereby deactivating electrical solenoid 48 and allowing the plunger 50 to drop and thereby close the outlet and open the inlet. Similarly, the filling time of the device should preferably be within a half to a minute so that it is ready for subsequent use of the toilet. The electrical solenoid 48 may be a two-way solenoid which positively moves the plunger 50 in either direction to ensure that the diaphragm valves are in a positive closing or opening position of the container inlet and outlet. The solenoid 48 may also be spring-loaded so that the diaphragm valve 54 is in the open position and valve 56 in the closed position and when the solenoid is activated, the plunger 54 is withdrawn against the force of a spring to reverse the position of the valves to permit the dispensing of the treatment solution 26.

The diaphragm 80 and 84 of diaphragm valves 54 and 56 may be made of several types of resilient materials which are suitable for use in diaphragm valves and are selected to resist corrosion by chemicals in the various types of treatment solutions. For example, the diaphragm may be made from natural rubber, synthetic rubber or rubber faced with TEFLON* to resist corrosion. Other types of suitable diaphragms are of fabric-reinforced materials to withstand the continual flexing made with natural rubber and other types of elastomers and also hightemp blackbutyl, hightemp whitebutyl, clear TYGON*, black TYGON*, HYCAR*, HYPOLON*, KEL-F*, and like polymeric materials which are highly resistant to corrosion by treatment solutions or the like contemplated in use.

*Trade mark

Each of the diaphragms consists of two sheets 124 and 126 as shown in FIG. 3, which are vulcanized together. The perimeter of each diaphragm is sandwiched between the respective end cap and valve seat body portion. Secured between vulcanized sheets 124 and 126 is a threaded bolt 130 having a head 132. An aperture 134 is provided in the sheet 124 which is unexposed to the treatment solution where the size of the head 132 is sufficiently greater than the aperture 134 to preclude withdrawal of the bolt from the diaphragm. The threaded bolt 120 is threaded into plunger 88 in the manner shown.

It is understood that the diaphragms may also be made by an injection molding process where the diaphragm is material molded around bolt 130 to secure the bolt therein.

In locating the threaded bolt to the diaphragm in this manner, the working parts of the valve, namely the plunger 88 and bolt 130 are isolated from the corrosive treatment solution. In securing the bolt head 132 to the diaphragm, it ensures a positive movement of the diaphragm to and from valve closing position. Similarly, there is a positive movement of the corresponding diaphragm 84.

The container 58 and valve seats 62 and 64 are also made of a material which is resistant to corrosion by a treatment solution, such as plastic materials which may be clear or opaque and are inexpensively manufactured in a mass production manner.

Although various preferred embodiments of the invention have been described in detail, it will be understood by those skilled in the art that variations may be made thereto without departing from the spirit of the invention or the scope of the appended claims.

The embodiments of an invention in which an exclusive property or privilege is claimed are defined as follows:

1. An apparatus for dosing a treatment solution into a waste liquid comprising a device for measuring and dispensing a predetermined volume of treatment solution, means for delivering treatment solution from a reservoir to said device and means for delivering a measured volume of treatment solution from said device to a waste liquid to be dosed, and control means adapted to determine when waste liquid is present to be dosed and activate said device to dispense a measured volume of treatment solution into a waste liquid, said device having a container which defines a chamber of predetermined volume with an inlet in communication with said means for delivering treatment solution to said device and an outlet in communication with said means for delivering treatment solution to waste liquid, an inlet valve and an outlet valve provided respectively at said inlet and said outlet, air vent means for venting said chamber during the filling and dispensing of treatment solution, said air vent means being adapted to prevent overflow of treatment solution from said vent means to the surroundings, reversible actuation means for simultaneously opening said inlet valve and closing said outlet valve to permit filling of said chamber with a treatment solution and for simultaneously closing said inlet valve and opening said outlet valve to permit dispensing a measured volume of treatment solution, said reversible actuation means being operated by said control means when waste liquid is to be dosed to thereby open said outlet valve and close said inlet valve so that waste liquid is dosed with a measured volume of treatment solution, said control means being adapted to close said outlet valve and open said inlet valve for refilling said chamber with treatment solution in the absence of waste liquid to be dosed.

2. The apparatus of claim 1 which is adapted for use in dosing waste liquid effluent from a flush toilet wherein said control means determines when a toilet is flushed to thereby operate said reversible actuation means.

3. An apparatus of claim 2 wherein said control means includes a sensing means for sensing when a toilet is flushed, said sensing means electrically activating an electrical solenoid when a toilet is flushed, said solenoid being adapted to operate said actuation means in a manner to dispense treatment solution from said container.

4. An apparatus of claim 1 wherein said inlet is located at the top of said container and said outlet is located at the bottom of said container, said inlet and outlet valves both being diaphragm valves with reciprocating plungers which open and close the valves when moved outwardly and inwardly.

5. An apparatus of claim 4 wherein said reciprocating plungers are moved by a linkage assembly which is adapted to move one of said reciprocating plungers in and simultaneously withdraw the other plunger thereby simultaneously closing and opening the respective diaphragm valves.

6. An apparatus of claim 5 wherein said linkage assembly comprises two parallel spaced-apart link arms, each parallel link arm having two free end portions and being pivotally mounted between its two free end portions on said container in a manner so that a first free end portion of each parallel link arm engages and is adapted to move the respective reciprocal plunger, said parallel link arms being interconnected at their second free end portions by a connecting member whereby said parallel link arms swing simultaneously in the same direction so that as one of the reciprocal plungers is moved inwardly by the respective parallel link arm to close the corresponding valve, the other reciprocal plunger is moved simultaneously outwardly by the respective parallel link arm to open the corresponding valve, drive arm means being connected to said linkage assembly to swing said parallel link arms in a direction which either fills said chamber with or dispenses from said chamber, a treatment solution.

7. An apparatus of claim 6 which is adapted for use in dosing waste liquid effluent from a flush toilet wherein said control means includes a device for sensing when a toilet is flushed, said device electrically activating an electrical solenoid when a toilet is flushed, said solenoid having a plunger which is connected to said drive arm means, the solenoid plunger being retracted when the solenoid is activated to move said parallel link arms in a direction so that said inlet valve is closed and said outlet valve is opened to thereby dispense treatment solution into a waste liquid.

8. An apparatus of claim 7 wherein said vent means is a tube connected to the top of said container and is in communication with said chamber, said tube extending upwardly to a position which is above the highest level at which treatment solution is stored in a reservoir.

9. An apparatus of claim 7 wherein said vent means is a tube connected to the top of said container and in communication with said chamber, said tube being returned to a reservoir for a treatment solution.

10. A device for measuring and dispensing a predetermined volume of liquid comprising a container which defines a chamber of a predetermined volume and which has an inlet and an outlet, an inlet valve and an outlet valve provided respectively at said inlet and outlet, air vent means for venting said chamber during the filling and dispensing of a liquid, reversible actuation means for simultaneously opening said inlet valve and closing said outlet valve to permit filling of said chamber with a liquid and for simultaneously closing said inlet valve and opening said outlet valve to permit dispensing of a measured volume of a liquid and control means for operating said reversible actuation means, said inlet and outlet valves being diaphragm valves with reciprocating plungers which open and close the valves when moved outwardly and inwardly, said reversible actuation means comprising a linkage assembly of two parallel spaced-apart link arms and an interconnecting member, each parallel link arm having two free end portions and being pivotally mounted between its two free end portions on said container in a manner so that a first free end portion of each parallel link arm engages and is adapted to move the respective reciprocal plunger, said parallel link arms being interconnected at their second free ends by said member whereby said parallel link arms swing simultaneously in the same direction so that as one of the reciprocal plungers is moved inwardly by the respective parallel link arm to close the corresponding valve, the other reciprocal plunger is moved simultaneously outwardly by the respective parallel link arm to open the corresponding valve.

11. A device of claim 10 wherein said control means includes an electrical solenoid with a moveable solenoid plunger connected to said linkage assembly, said solenoid being activated when it is desired to dispense a predetermined volume of a liquid to thereby move the solenoid plunger in a direction such that said outlet valve is opened and said inlet valve is closed.

12. A device of claim 10 wherein each diaphragm valve includes a diaphragm of two sheets of flexible material held in contacting relationship at their circumferences, the sheet of material which is unexposed to a treatment solution in said container having an aperture cut therein, a threaded bolt extending outwardly through said aperture with the head of the bolt lying between said two sheets of flexible material, the head of said bolt being significantly larger than said aperture to preclude withdrawal of the head of the bolt from between said two flexible sheets, each plunger being adapted to threadably receive a threaded bolt of a respective diaphragm valve to thereby engage the diaphragm.

* * * * *